US012710204B2

(12) United States Patent
Buschle

(10) Patent No.: US 12,710,204 B2
(45) Date of Patent: Aug. 18, 2026

(54) ROLL BOND EVAPORATOR PLATE

(71) Applicant: Binder GmbH, Tuttlingen (DE)

(72) Inventor: Jochen Buschle, Tuttlingen (DE)

(73) Assignee: Binder GmbH, Tuttlingen (DE)

( * ) Notice: Subject to any disclaimer, the term of this patent is extended or adjusted under 35 U.S.C. 154(b) by 70 days.

(21) Appl. No.: 18/675,344

(22) Filed: May 28, 2024

(65) Prior Publication Data

US 2024/0401850 A1 Dec. 5, 2024

(30) Foreign Application Priority Data

May 30, 2023 (DE) ..................... 10 2023 114 063.9

(51) Int. Cl.

*F25B 39/00* (2006.01)
*F25B 39/02* (2006.01)
*G01N 1/42* (2006.01)

(52) U.S. Cl.

CPC ........... *F25B 39/00* (2013.01); *F25B 39/024* (2013.01); *G01N 1/42* (2013.01)

(58) Field of Classification Search

CPC .... F25B 39/00; F25B 39/024; F25B 2500/18; F25B 5/02; F25B 39/022; F25B 2500/01; G01N 1/42; F25D 21/04; F25D 19/00; F28D 1/0308; F28F 3/14; F28F 17/005; H05K 7/20309

See application file for complete search history.

(56) References Cited

U.S. PATENT DOCUMENTS 4,535,600 A * 8/1985 Gelbard ................ F25D 29/005 62/227
2012/0087088 A1* 4/2012 Killion ...................... F28F 3/12 165/104.25
2017/0276419 A1* 9/2017 Jeong .................... F25D 11/006
2018/0245826 A1* 8/2018 Jung ....................... F25B 39/02
2018/0292121 A1* 10/2018 Kim ...................... F25D 21/125
2022/0136785 A1* 5/2022 Hosono .................. F25B 41/30 62/498

FOREIGN PATENT DOCUMENTS

DE 84 34 381 U1 2/1985
DE 295 04 538 U1 5/1995
DE 10 2009 002 032 A1 10/2010
EP 0758732 A2 * 2/1997 ........... F25D 11/022

OTHER PUBLICATIONS

Schmid , Refrigerator, Feb. 19, 1997 , EP0758732A2, Whole Document (Year: 1997).*
German Search Report for DE 10 2023 114 063.9 dated Feb. 6, 2024.

* cited by examiner

*Primary Examiner* — Elizabeth J Martin
*Assistant Examiner* — Adam Dorrel Moore
(74) *Attorney, Agent, or Firm* — Akerman LLP; Peter A. Chiabotti

(57) ABSTRACT

The application relates to a roll bond evaporator plate with a width and a height, wherein the roll bond evaporator plate comprises at least one cutout which is delimited at least on three side edges by the roll bond evaporator plate. The application further relates to a refrigerant circuit with such roll bond evaporator plate as well as to a laboratory chamber, climate chamber, cold chamber or environment simulation chamber with such roll bond evaporator plate.

11 Claims, 7 Drawing Sheets

ROLL BOND EVAPORATOR PLATE

FIELD OF APPLICATION

The application relates to a roll bond evaporator plate, a refrigerant circuit with such a roll bond evaporator plate as well as to a laboratory chamber, climate chamber, cold chamber or environment simulation chamber with such a roll bond evaporator plate.

BACKGROUND

Roll bonding describes a process in which two metal sheets are joined together by rolling under high pressure, wherein certain portions of the sheet are recessed or treated with separating agents such that they cannot be bonded at these sites. These regions can subsequently be inflated by means of compressed air such that conduits can be formed.

It is known to employ an evaporator plate generated by the roll bonding process, in the following referred to as roll bond evaporator plate, as a cooling surface in laboratory chambers, climate chambers, cold chambers, or environment simulation chambers in order to enable setting a desired temperature within the interior volume of these chambers.

In such chambers there is the problem that at too high an air humidity at correspondingly low temperature condensate forms which can lead to undesirable formation of drops. To prevent the formation of condensate at any site in the interior volume of these chambers it is known to provide intentional dehumidification surfaces. In this regard EP 0 758 732 A2 discloses a refrigerator appliance with a refrigeration chamber and a freezer compartment, the evaporator of which comprises two series-connected evaporator sections with pipe sections carrying the refrigerant, of which the section, into which a compressor provided with a control device introduces the refrigerant, is assigned to the freezer compartment, wherein the evaporator section assigned to the refrigeration chamber is comprised of a plate of a material with good thermal conductivity whose dimension is designed for the area required for the dehumidification, wherein the plate is bonded with the duct section conducting the refrigerant such that this plate receives the cooling capacity required for the refrigeration chamber at substantially equal temperature distribution. Of disadvantage in such an embodiment is that due to the coupling between evaporator section and dehumidification plate, highly precise tuning must take place.

SUMMARY

The application therefore addresses the problem of providing an evaporator plate, in particular for laboratory chambers, climate chambers, cold chambers or environment simulation chambers, which enable improved dehumidification.

According to the application the problem is resolved through a roll bond evaporator plate with the characteristics disclosed herein, a refrigerant circuit with such a roll bond evaporator plate with the characteristics disclosed herein as well as a laboratory chamber, climate chamber, cold chamber, or environment simulation chamber with the characteristics of disclosed herein.

Advantageous embodiments and further developments of the application are specified in the dependent claims.

The roll bond evaporator plate according to the application with a width and a height is distinguished thereby that it comprises at least one cutout which is delimited on at least three side edges by the roll bond evaporator plate. In the following by cutout is to be understood in particular a perforation from a front side of the roll bond evaporator plate to a back side of the roll bond evaporator plate.

The cutout is in particular of rectangular shape with a width and a height as well as four side edges. The roll bond evaporator plate is also in particular of rectangular form with a width and a height as well as four side edges. If the cutout is delimited at least on three side edges by the roll bond evaporator plate, this can mean, expressed in different words, that at most one side edge of the cutout coincides with a side edge of the roll bond evaporator plate. The cutout in this case is a lateral recess, lateral clearance or edgewise removal, in the roll bond evaporator plate.

The cutout according to the application comprises the advantage that within this cutout a separate dehumidification plate can be disposed. The roll bond evaporator plate can consequently be utilized exclusively for cooling and be optimized for this purpose, while the separate dehumidification plate can be utilized exclusively for dehumidification and be optimized for this purpose. Moreover, the disposition of the cutout in the roll bond evaporator plate enables the specific positioning of a surface on which the condensation is to occur without significantly affecting the cooling effect through the roll bond evaporator plate.

If the cutout is advantageously delimited by the roll bond evaporator plate on four side edges, this can mean, expressed differently, that no side edge of the cutout coincides with a side edge of the roll bond evaporator plate. The cutout forms in this case a perforation in the interior of the roll bond evaporator plate.

The cutout is preferably disposed centrally along the width in order to be able to enable favorable positioning of the separate dehumidification plate substantially symmetrically with respect to the longitudinal axis in the interior volume of a laboratory chamber, climate chamber, cold chamber or environment simulation chamber.

According to a further development of the application the roll bond evaporator plate comprises two cutouts which are preferably disposed symmetrically with respect to the longitudinal axis of the roll bond evaporator plate. In particular in the case of relatively large laboratory chambers, climate chambers, cold chambers or environment simulation chambers, it is useful to provide several, for example two, cutouts in order to be able to enable reliable dehumidification in the entire interior volume. Through the symmetrical disposition uniform dehumidification can be improved.

The cutout is advantageously disposed in the lower third along the height in order to be able to enable favorable positioning of the separate dehumidification plate relative to a condensate drain which, as a rule, is disposed at the lower edge of the roll bond evaporator plate.

According to an advantageous further development of the application the cutout comprises a width which accounts for less than 50%, preferably less than 40%, especially preferably less than 25% of the width of the roll bond evaporator plate. A dehumidification plate disposed within the cutout is thereby developed correspondingly small in order to be able to provide the lowest feasible dew point and to affect as little as feasible the temperature provided by the roll bond evaporator plate.

A preferred embodiment of the application provides that the cutout comprises a height that accounts for less than 50%, preferably less than 40%, especially preferably less than 25% of the height of the roll bond evaporator plate. A dehumidification plate disposed within the cutout is thereby also developed correspondingly small in order to be able to provide the lowest feasible dew point and to affect as little as feasible the temperature provided by the roll bond evaporator plate.

A refrigerant circuit according to the application with a compressor, a condenser and a roll bond evaporator plate according to the application comprises a dehumidification plate disposed in the cutout. Decoupling of cooling by the roll bond evaporator plate and dehumidification by the dehumidification plate enable optimized layout of both plates for the respective functions, wherein the disposition of the dehumidification plate in a cutout in the roll bond evaporator plate permits the favorable positioning of the dehumidification plate.

The temperature of the dehumidification plate can here in particular be different from the temperature of the roll bond evaporator plate in order to be able to lay out both plates optimally for each particular function.

The temperature of the dehumidification plate is especially preferably controllable independently of the temperature of the roll bond evaporator plate in order to be enabled to set the desired temperature separately for each of the two plates. According to an alternative preferred embodiment the temperature of the dehumidification plate is settable at a defined difference from the temperature of the roll bond evaporator plate. It can thereby be ensured in simple manner, in particular with few components, that the dehumidification plate in every situation has a lower temperature than the roll bond evaporator plate in order to be able to enable reliable dehumidification.

The dehumidification plate can involve a cooled plate. The dehumidification plate is preferably developed as a further roll bond evaporator plate.

According to an advantageous further development of the application the roll bond evaporator plate and the dehumidification plate are connected in parallel in the refrigerant circuit. This enables the effective utilization of the refrigerant.

A laboratory chamber, climate chamber, cold chamber or environment simulation chamber with a sample compartment comprises a roll bond evaporator plate according to the application and a refrigerant circuit according to the application, wherein the roll bond evaporator plate is disposed on the outer side of the sample compartment, in particular on the outer side of the back side of the sample compartment. By disposing the roll bond evaporator plate in such manner effective cooling of the sample compartment is enabled.

BRIEF DESCRIPTION OF THE DRAWINGS

An embodiment example of the application will be explained in greater detail in conjunction with the following Figures. Therein depict.

DETAILED DESCRIPTION

Identical reference numbers denote in all Figures identical or functionally identical parts, wherein for greater clarity not all reference numbers are provided in all Figures.

Figure 1:
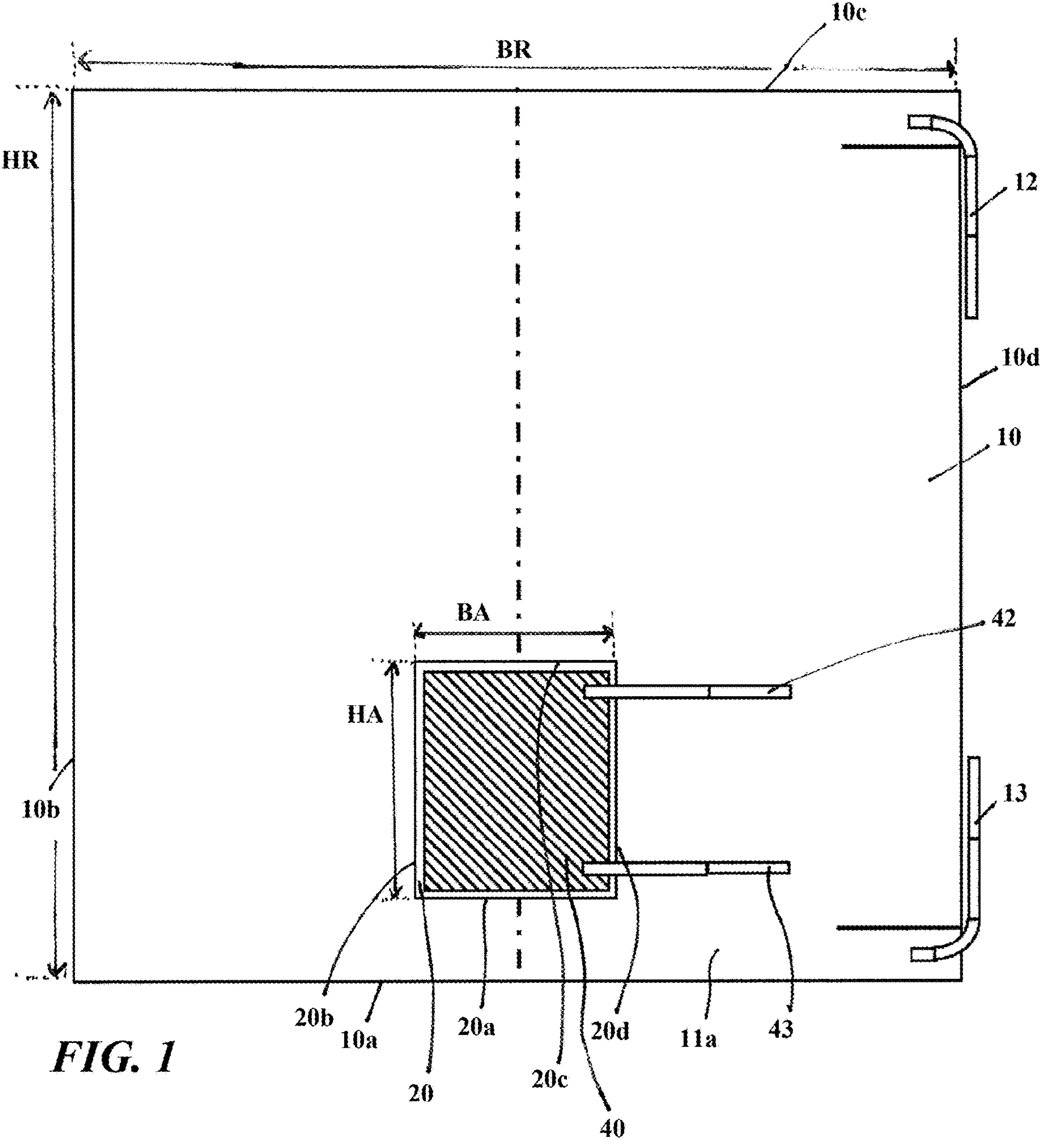
FIG. 1 a schematic representation of a first embodiment example of a roll bond evaporator plate according to the application with a cutout, wherein in the cutout a dehumidification plate is disposed, FIG. 2 a view onto the rear wall of a laboratory chamber, climate chamber, cold chamber or environment simulation chamber with a roll bond evaporator plate according to FIG. 1 disposed thereon, FIG. 3 a representation of a second embodiment example of a roll bond evaporator plate according to the application with a cutout, FIG. 4 the roll bond evaporator plate according to FIG. 3 with a dehumidification plate disposed in the cutout, FIG. 5 a view onto the rear wall of a laboratory chamber, climate chamber, cold chamber or environment simulation chamber with a roll bond evaporator plate according to FIG. 4 disposed thereon, FIG. 6 a schematic representation of a refrigerant circuit with a roll bond evaporator plate according to FIG. 1 or FIG. 4 disposed thereon.

FIG. 1 shows a schematic representation of a first embodiment example of a roll bond evaporator plate 10. The roll bond evaporator plate 10 was produced in a roll bonding process by joining together two metal sheets through rolling at high pressure, wherein certain regions of the metal sheet are recessed or are treated with separation means such that they cannot be bonded in these regions. These regions can subsequently be inflated by means of compressed air such that conduits can form. In the embodiment example depicted in FIG. 1 only one inlet 12 and one outlet 13 into a conduit disposed in the roll bond evaporator plate 10 are depicted; the conduit itself is not shown in this embodiment example.

The roll bond evaporator plate 10 is substantially developed in rectangular form with a front side 11*a*, a back side (not discernible in the Figures due to the plan view onto the front side 11*a*) and four side edges 10*a*, 10*b*, 10*c*, 10*d*. The roll bond evaporator plate 10 herein is of a height HR and a width BR.

The roll bond evaporator plate 10 comprises a cutout 20 which is developed, in particular, of rectangular form with a width BA, a height HA and four side edges 20*a*, 20*b*, 20*c*, 20*d*. The cutout 20 extends in particular from the front side 11*a* up to the back side and therewith penetrates the roll bond evaporator plate 10 completely. The cutout 20 is delimited on at least three side edges 20*b*, 20*c*, 20*d* by the roll bond evaporator plate 10. In this case the side edge 20*a* would lie on the side edge 10*a* of the roll bond evaporator plate 10 and the cutout 20 would form a lateral clearance or sidewise removal.

In the embodiment examples depicted in the Figures the cutout 20 is delimited at the four side edges 20*a*, 20*b*, 20*c*, 20*d* by the roll bond evaporator plate 10. The cutout 20 forms in this case a breakthrough opening in the interior of the roll bond evaporator plate 10.

The cutout 20 can be disposed in particular approximately centrally along the width BR of the roll bond evaporator plate 10. If several cutouts 20 are provided (not shown), they can be disposed, in particular, symmetrical with respect to the longitudinal axis of the roll bond evaporator plate 10. The cutout 20, furthermore, can be disposed in the lower third along the height HR of the roll bond evaporator plate 10 (cf. FIG. 1).

The width BA of the cutout 20 accounts, in particular, for less than 50%, preferably less than 40%, for example less than 25% of the width BR of the roll bond evaporator plate 10. The height HA of cutout 20 accounts, in particular, for less than 50%, preferably less than 40%, for example less than 25% of the height HR of the roll bond evaporator plate 10.

As depicted in FIG. 1, in the cutout 20 can be disposed a dehumidification plate 40. In terms of its dimensions this dehumidification plate 40 is, in particular, developed such that it substantially fills the cutout 20 completely. The dehumidification plate 40 can, for example, also be developed as a roll bond evaporator plate and comprise an inlet 42 and an outlet 43 into a conduit not depicted in FIG. 1.

Figure 2:
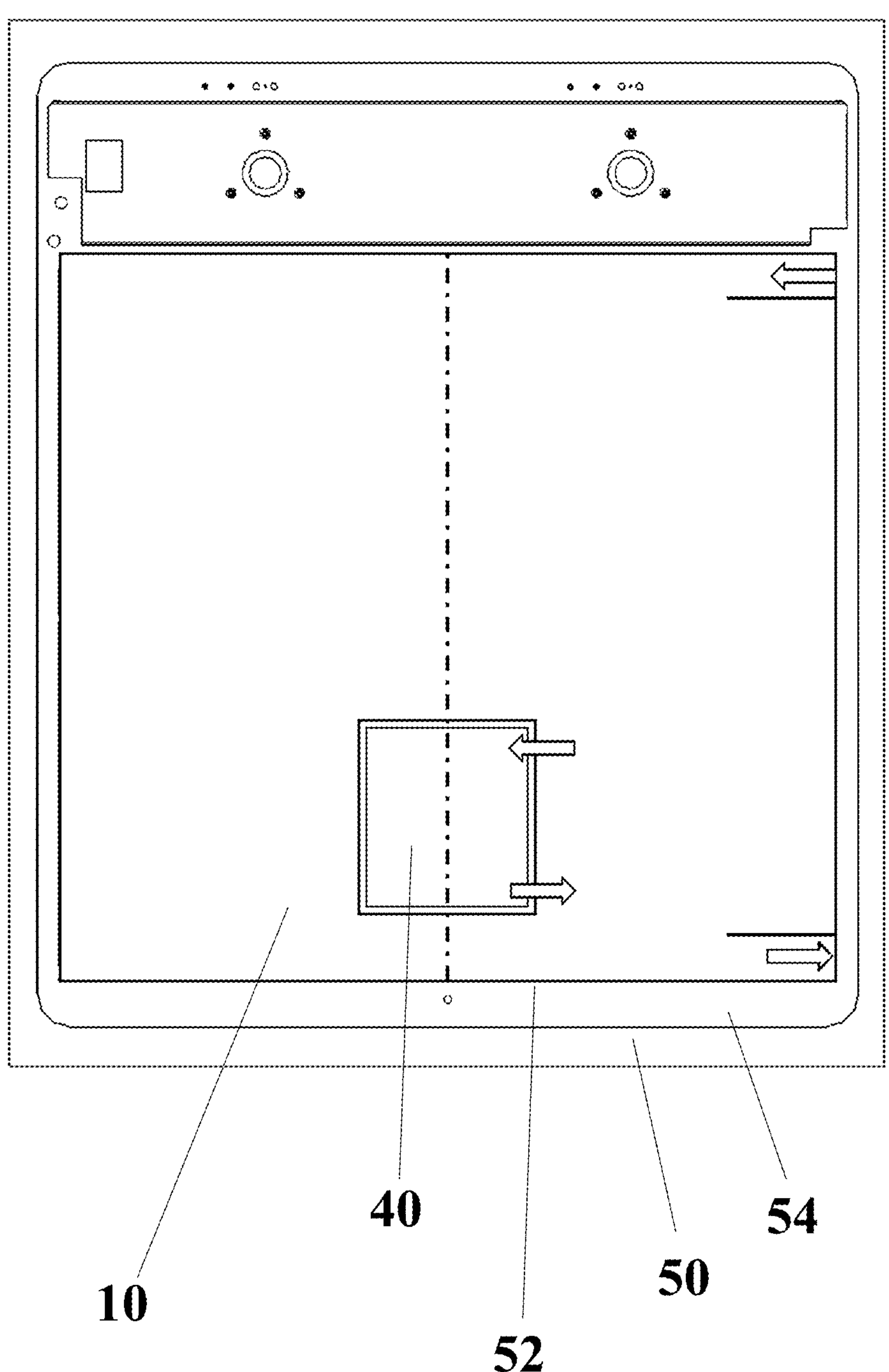

FIG. 2 shows the roll bond evaporator plate 10 according to FIG. 1 with the dehumidification plate 40 in a chamber 50 which is developed as a laboratory chamber, climate chamber, cold chamber or environment simulation chamber. The chamber 50 comprises a sample compartment 52 with a rear wall 54, wherein the roll bond evaporator plate 10, in particular, is disposed on the outer side of the rear wall 54.

Figure 3:
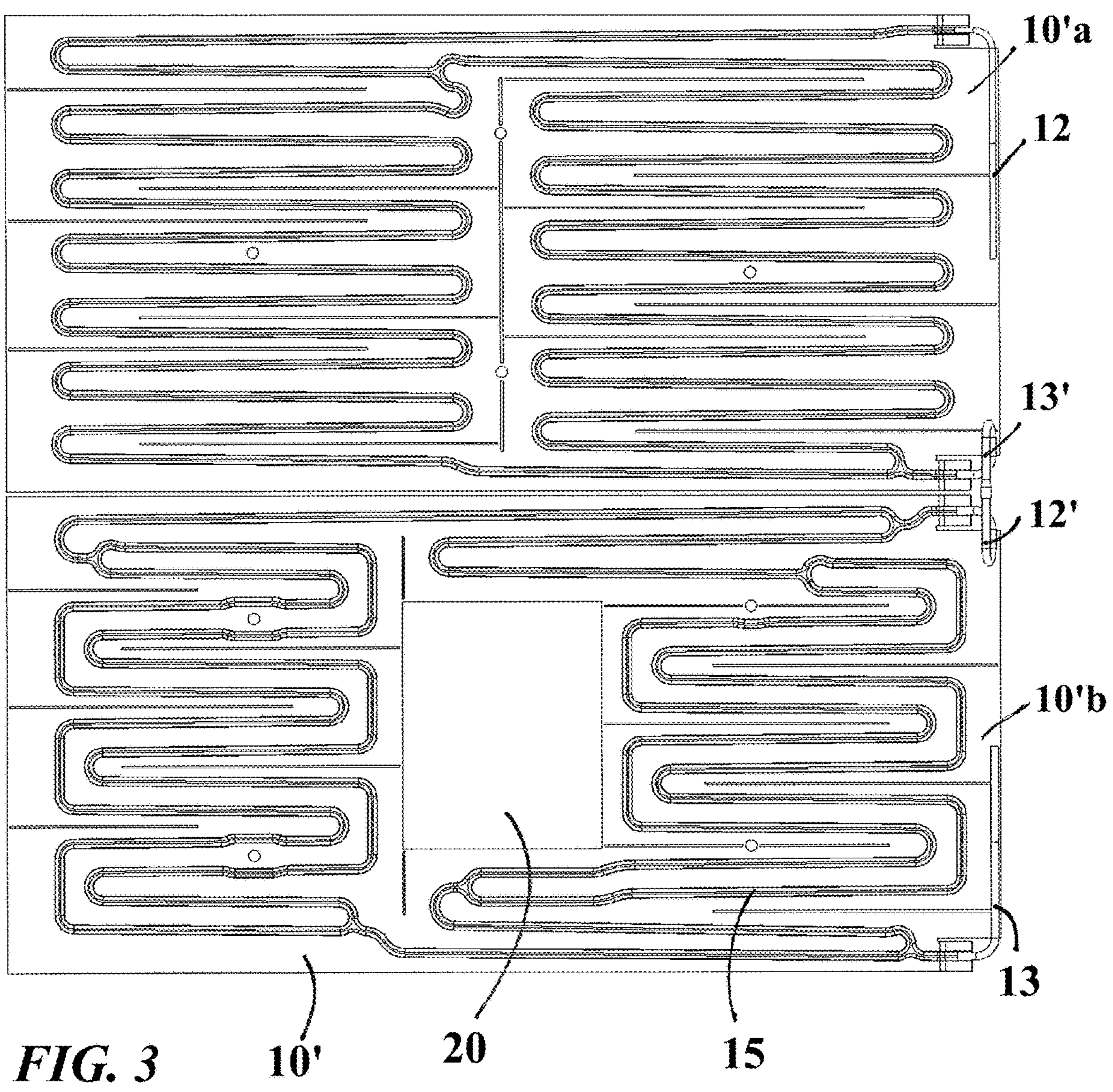

The embodiment example of a roll bond evaporator plate 10' depicted in FIG. 3 substantially differs from the roll bond evaporator plate 10 depicted in FIG. 1 thereby that conduit 15 between the inlet 12 and the outlet 13 is additionally discernible. Furthermore, the height of the roll bond evaporator plate 10' is developed in two parts, with an upper roll bond evaporator plate 10'*a* and a lower roll bond evaporator plate 10'*b*, wherein an outlet 13' of the upper roll bond evaporator plate 10'*a* is directly connected with an inlet 12' of the lower roll bond evaporator plate 10'*b*. The cutout 20 is only disposed in the lower roll bond evaporator plate 10'*b* while the upper roll bond evaporator plate 10'*a* does not comprise a cutout. Through such a series connection of two roll bond evaporator plates 10'*a*, 10'*b* the area of the roll bond evaporator plate 10' can be enlarged in simple manner in order to be able, for example, to adapt it to the area of the corresponding chamber 50.

Figure 4:
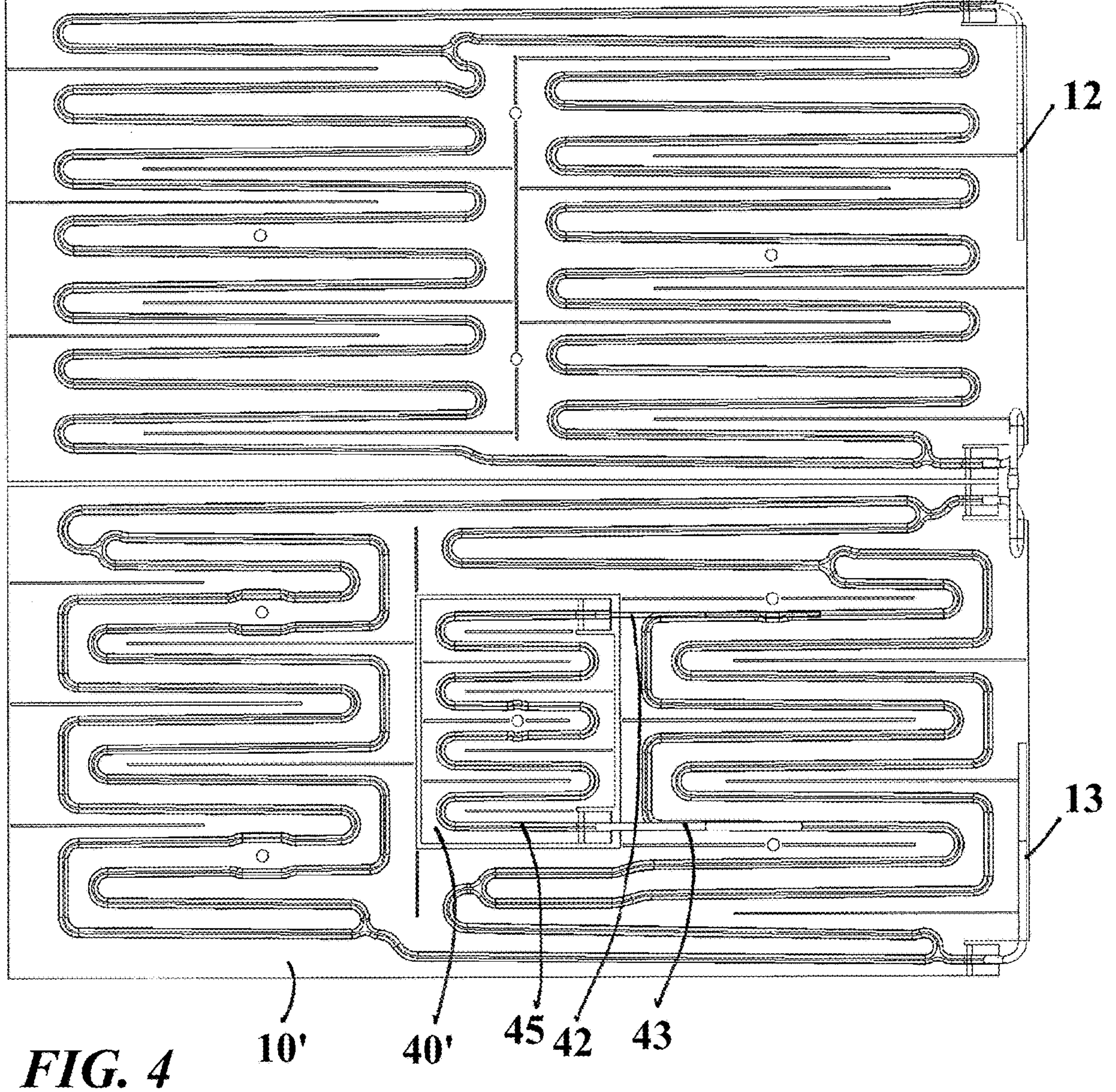
Figure 5:
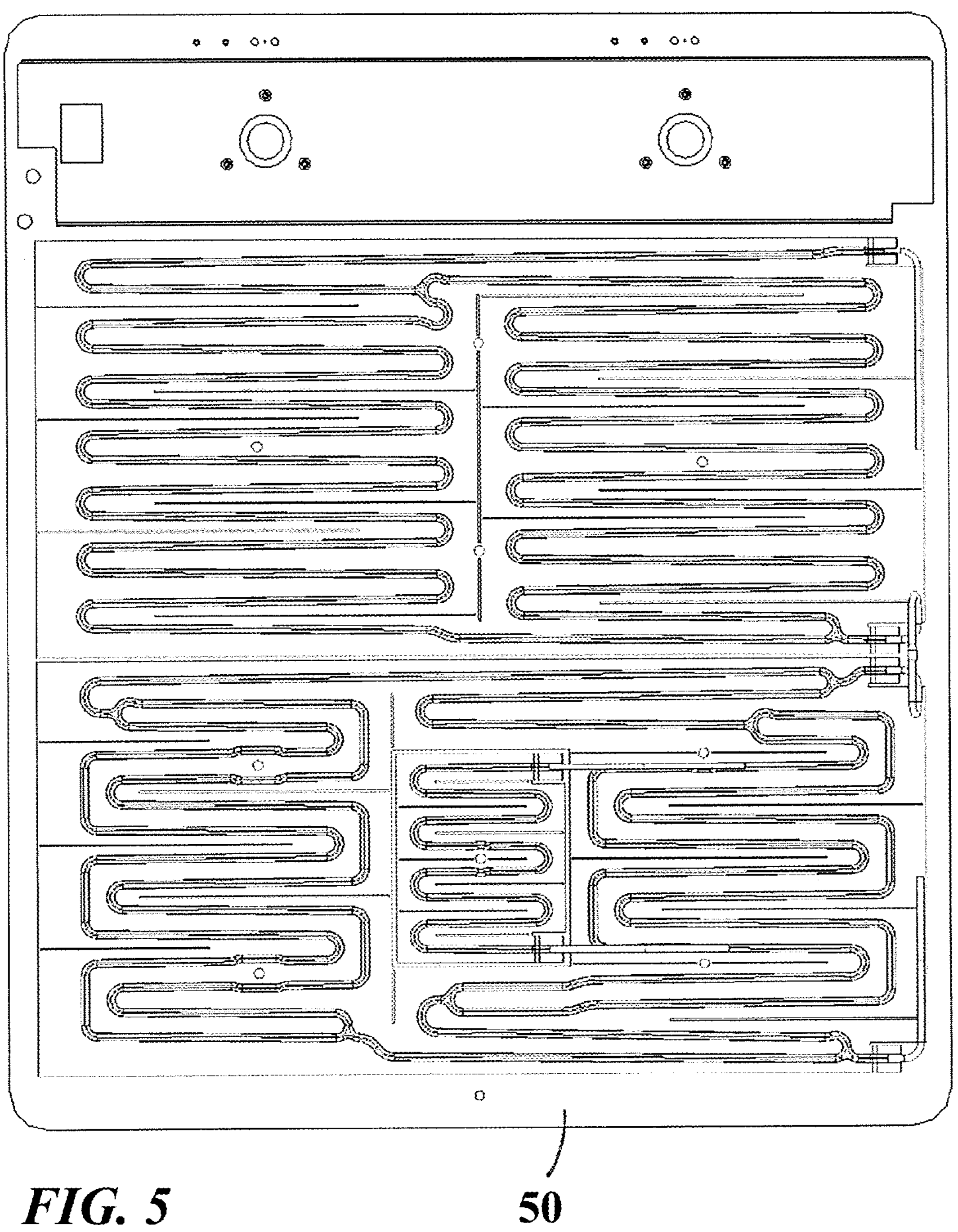

FIG. 4 shows the roll bond evaporator plate 10' according to FIG. 3 with the dehumidification plate 40' disposed in cutout 20, wherein this dehumidification plate 40' differs substantially from the dehumidification plate 40 depicted in FIG. 1 in that additionally the conduit 45 between the inlet 42 and the outlet 43 is discernible. FIG. 5 illustrates the disposition of the roll bond evaporator plate 10' according to FIG. 4 in the chamber 50.

Figure 6:
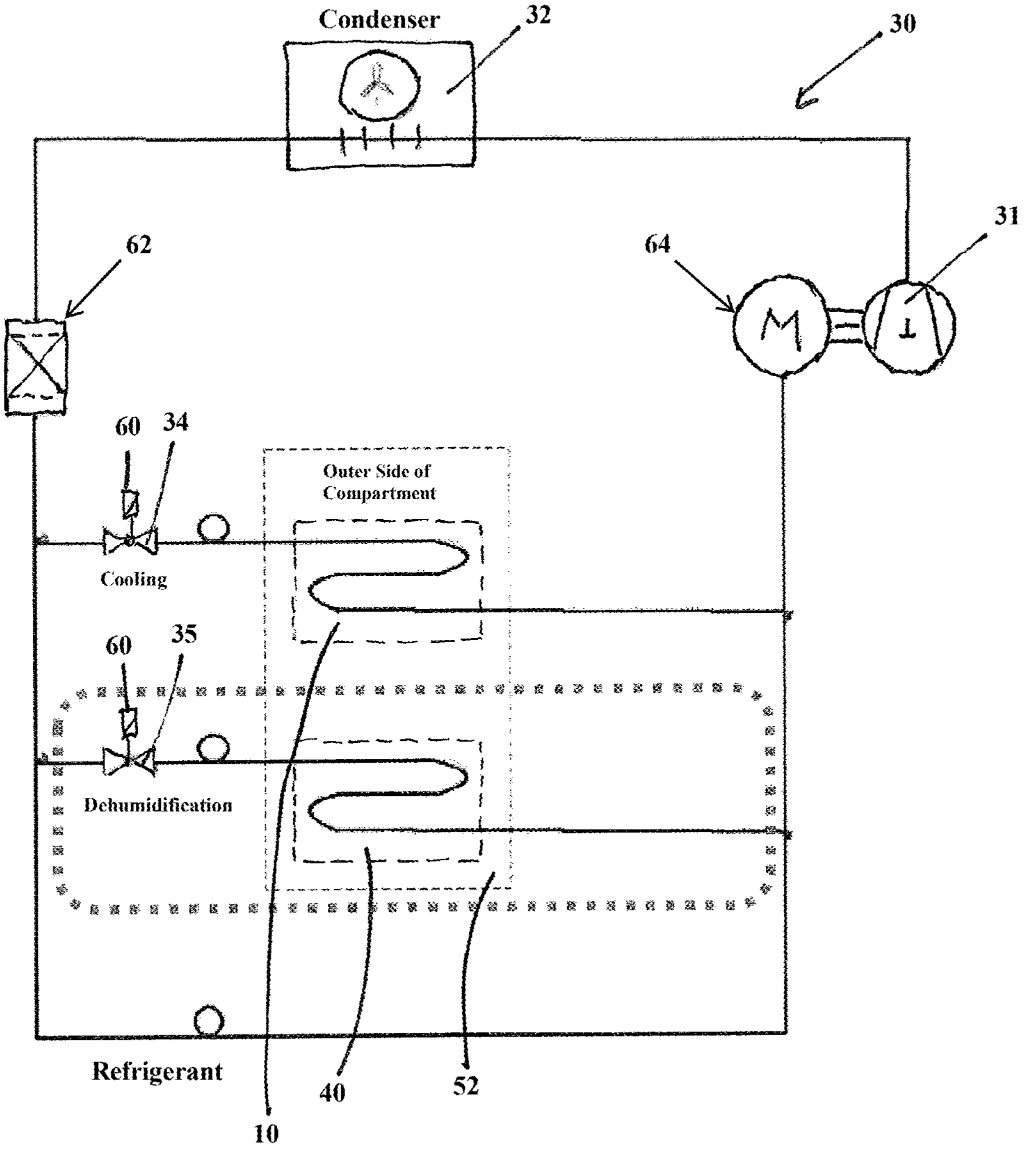
Figure 7:
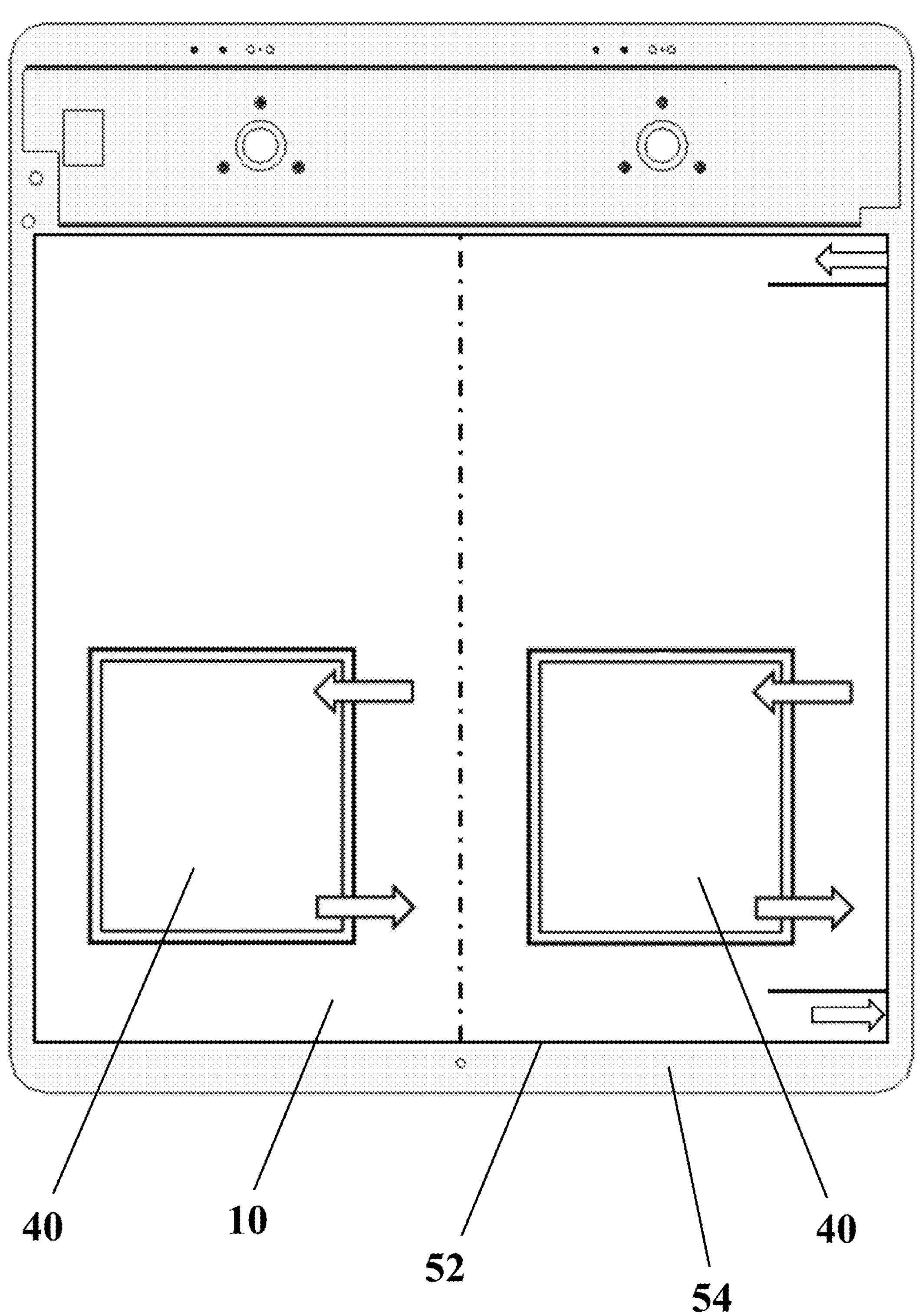
FIG. 7 a view onto the rear wall of a laboratory chamber, climate chamber, cold chamber or environment simulation chamber of a roll bond evaporator plate according to the application with two cutouts.

FIG. 6 shows schematically a refrigerant circuit 30 with a compressor 31, a condenser 32, a filter element 62, a motor 64, and a roll bond evaporator plate 10 with the dehumidification plate 40 as described previously, wherein the temperature of the dehumidification plate 40 is controllable independent of the temperature of the roll bond evaporator plate 10. The control can take place in particular thereby that the roll bond evaporator plate 10 and the dehumidification plate 40 in the refrigerant circuit 30 are connected in parallel. The supply of refrigerant into the roll bond evaporator plate 10 can be controlled across a valve 34, the supply of refrigerant into the dehumidification plate 40 can be controlled across a valve 35. The valves 34, 35 are herein in particular actuatable across a control unit 60. Such refrigerant circuit 30 can, in particular, be applied in the chamber 50 according to FIG. 2 or 5.

The independent temperature control for roll bond evaporator plate 10 and dehumidification plate 40 enable setting specifically a colder temperature on the dehumidification plate 40 in order to effect condensation only at a desired position within the sample compartment 52, namely on the dehumidification plate 40. There is also the feasibility to set a temperature on the dehumidification plate 40 which is lower by a fixed number of degrees than the temperature on the roll bond evaporator plate 10. The positioning of the dehumidification plate 40 substantially centrally in the lower third of the rear wall 54 of the sample compartment enables good drainage of the condensate without significantly affecting the temperature distribution provided by the roll bond evaporator plate 10.

LIST OF REFERENCE SYMBOLS

10 Roll bond evaporator plate
10' Roll bond evaporator plate
10'*a* Upper roll bond evaporator plate
10'*b* Lower roll bond evaporator plate
10*a* Side edge
10*b* Side edge
10*c* Side edge
10*d* Side edge
11*a* Front side
12 Inlet
12' Inlet
13 Outlet
13' Outlet
15 Conduit
20 Cutout
20*a* Side edge
20*b* Side edge
20*c* Side edge
20*d* Side edge
30 Refrigerant circuit
31 Compressor
32 Condenser
34 Valve
35 Valve
40 Dehumidification plate
40' Dehumidification plate
42 Inlet
43 Outlet
45 Conduit
50 Chamber
52 Sample compartment
54 Rear wall
60 Control unit
BR Width
HR Height
BA Width
HA Height

The invention claimed is:

1. A structure, comprising:
a roll bond evaporator plate with a width and a height, and comprising at least one cutout, which is delimited on at least three side edges by the roll bond evaporator plate;
a refrigerant circuit with a compressor;
a condenser;
a dehumidification plate disposed in the at least one cutout;
wherein the roll bond evaporator plate and the dehumidification plate are connected in parallel in the refrigerant circuit; and
wherein the roll bond evaporator plate and the dehumidification plate are arranged in the same plane.

2. The structure of claim 1, wherein the at least one cutout is delimited on four side edges by the roll bond evaporator plate.

3. The structure of claim 1, wherein the at least one cutout is disposed approximately centrally along the width of the roll bond evaporator plate.

4. The structure of claim 1, wherein the roll bond evaporator plate comprises two cutouts which are disposed symmetrically with respect to a longitudinal axis of the roll bond evaporator plate, and wherein in each of the two cutouts a dehumidification plate is arranged.

5. The structure of claim 1, wherein the at least one cutout is disposed in a lower third along the height of the roll bond evaporator plate.

6. The structure of claim 1, wherein the at least one cutout has a cutout width which accounts for less than 50% of the width of the roll bond evaporator plate.

7. The structure of claim 1, wherein the at least one cutout has a cutout height which accounts for less than 50% of the height of the roll bond evaporator plate.

8. The structure of claim 1, wherein a temperature of the dehumidification plate is different than a temperature of the roll bond evaporator plate.

9. The structure of claim 1, wherein the temperature of the dehumidification plate is controllable independently of the temperature of the roll bond evaporator plate or the temperature of the dehumidification plate is settable at a defined difference from the temperature of the roll bond evaporator plate.

10. The structure of claim 1, wherein the dehumidification plate is developed as a further roll bond evaporator plate.

11. The structure of claim 1, further comprising:

a laboratory chamber, climate chamber, cold chamber or environment simulation chamber with a sample compartment, wherein the roll bond evaporator plate is disposed on an outer side of the sample compartment.

* * * * *